Sept. 16, 1969 R. T. INNIS ET AL 3,467,934
FLEXIBLE-TUBE FUSE CONSTRUCTION
Filed Sept. 25, 1967 2 Sheets-Sheet 1
FIG.I. PRIOR ART
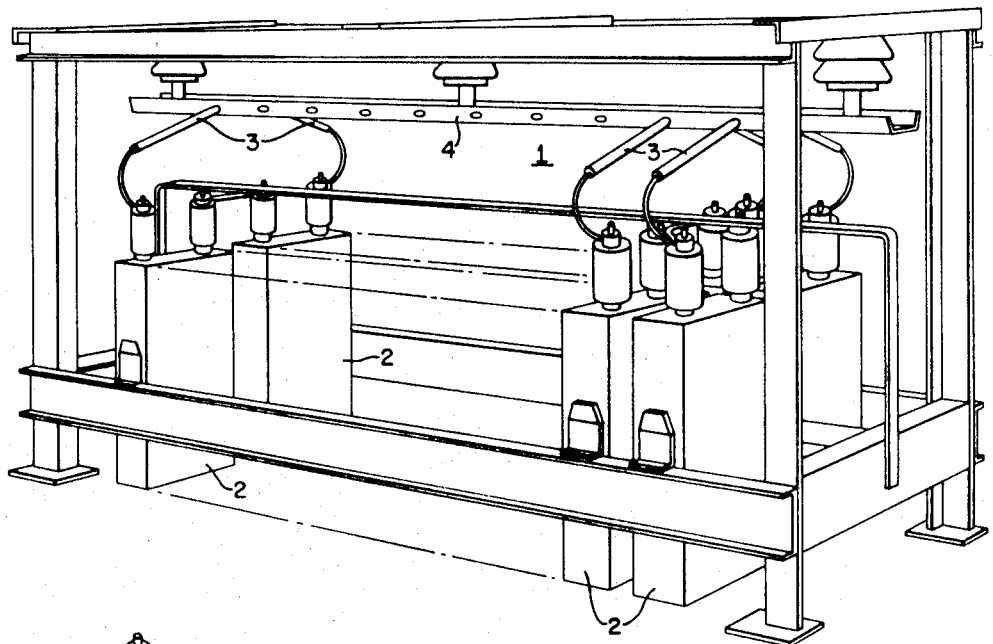
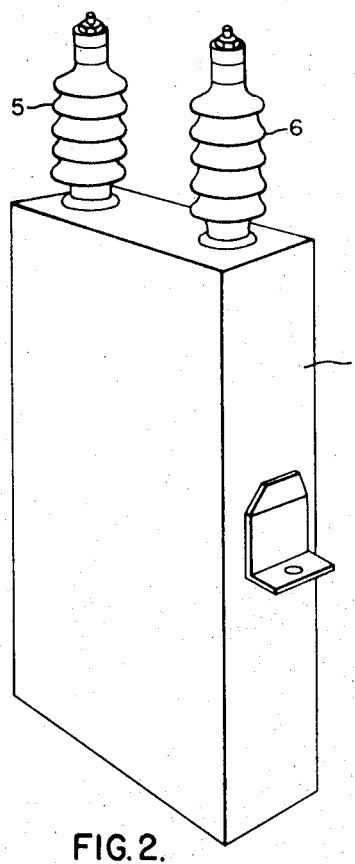
FIG. 2.
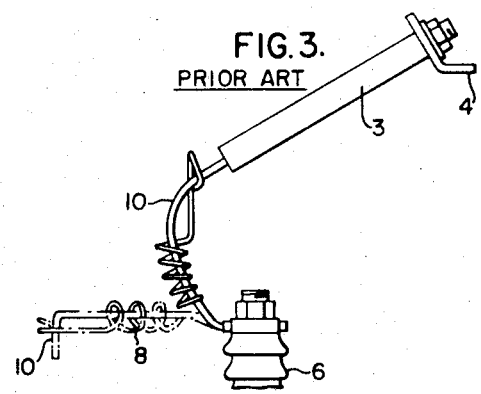
FIG. 3.
PRIOR ART
INVENTORS
George E. Mercier
and Robert T. Innis
BY
*Willard R. Crout*
ATTORNEY

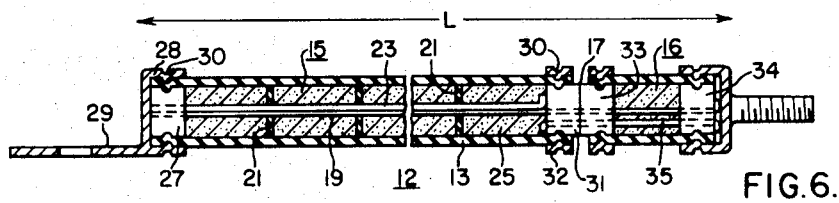
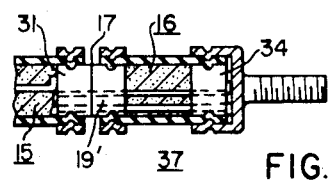
FIG. 4.
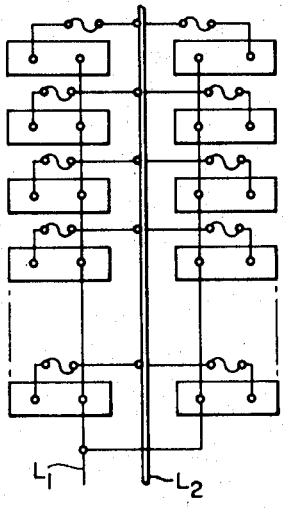
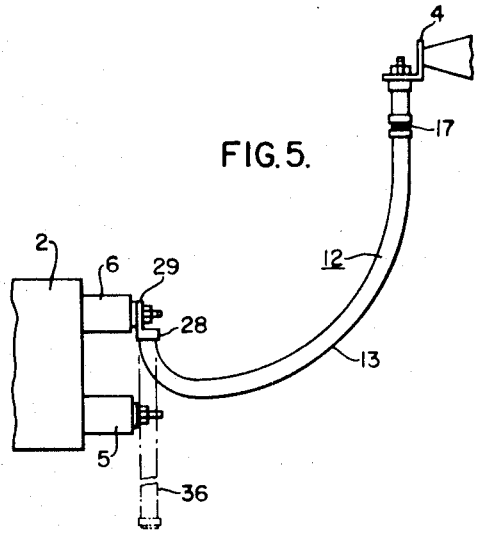
FIG. 5.
FIG. 4A.
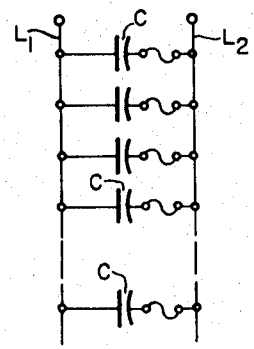
FIG. 7.
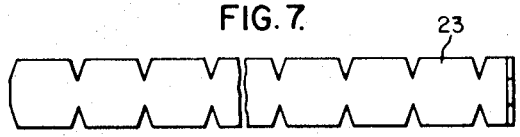
FIG. 8.
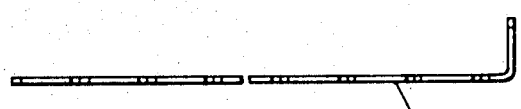

United States Patent Office 3,467,934
Patented Sept. 16, 1969

3,467,934
FLEXIBLE-TUBE FUSE CONSTRUCTION
Robert T. Innis, Ellettsville, and George E. Mercier, Bloomington, Ind., assignors to Westinghouse Electric Corporation, Pittsburgh, Pa., a corporation of Pennsylvania
Filed Sept. 25, 1967, Ser. No. 670,077
Int. Cl. H01h 71/20, 85/36
U.S. Cl. 337—144                8 Claims

ABSTRACT OF THE DISCLOSURE

An indicating sectional fuse, having a flexible fuse tube, is provided with a high-current section and a low-current section with the sections separable, upon fuse operation, to provide a break-away indicating position between the bus-bar and the capacitor terminal. The high-current section of the fuse may contain a silver fuse element spaced centrally within the flexible fuse tube and in electrical parallel with a Nichrome strain element, and the low-current section of the fuse may comprise a low-temperature meltable fuse element, also in parallel with the aforesaid Nichrome strain element, which may extend the entire length of the fuse.

CROSS-REFERENCES TO RELATED APPLICATIONS

Applicants are not aware of any related applications which are pertinent to the present invention.

BACKGROUND OF THE INVENTION

In recent years, in electrical systems, the use of capacitor units for phase correction has become more and more common place. Capacitors are usually mounted in banks, and have any convenient or desired kvar. ratings. It is very desirable to have a current-limiting fuse in series with each capacitor to prevent case rupture in the event of breakdown and to prevent damage to the entire capacitor bank. Preferably the fuse should be capable of disconnecting itself from the circuit, thereby eliminating tracking, which can cause oscilatory current, which can damage other capacitors in the bank.

In one well-known type of capacitor bank construction, an indicating fuse is mounted on the aluminum bus above each capacitor unit. Connection to the capacitor units is made by a flexible pigtail. The pigtail is passed through a coil spring fuse element ejector and indicator mounted on the capacitor unit terminal. The spring is held in a curved position when the fuse is intact. When the fuse blows, the spring moves to a horizontal position, pulling the pigtail or fuse link from the fuseholder. Normally, the strain link of prior art fuses, that is, the link which resists the force of the coil spring is in tension, requiring that the link be firmly anchored at one end to a conductor rod and be anchored at the other end to the pigtail of the fuse. An improved construction of such type is set forth in U.S. Patent 3,259,719, issued July 5, 1966, to Robert T. Innis and George A. Rusnak and assigned to the assignee of the instant application.

SUMMARY OF THE INVENTION

In accordance with a preferred embodiment of the present invention, there is provided a dual current-limiting type of capacitor fuse incorporating sections, one being a high-current section and the other a low-current section. Preferably, the fuse-tube casing is made out of a flexible, or non-rigid material and flexed during normal operation of the fuse, with the arrangement being such that during fuse operation, the two abutting sections will break away from each other, thereby indicating fuse operation. The high-current section may comprise a high-current silver fuse element centrally located within the flexible tube casing by insulating spacers having sand interposed between the fuse element and the inner wall of the flexible casing. The low-current fuse sectional portion may comprise a low-temperature meltable fuse element, say of a tin-lead solder, which will melt at a relatively low temperature; and both the high-current and low-current fuse elements are paralleled by a strain element, such as Nichrome wire, to maintain the two fuse sections in abutting relationship. Upon fuse operation, either high-current or low-current operation, the current is passed through the Nichrome strain element, which will become vaporized and permit a break-away action between the two fuse sections to cause a visible indication and complete disconnected operation for isolating the faulted capacitor element.

In accordance with another embodiment of the invention, the Nichrome strain element need not pass entirely through the entire fuse structure, but may terminate at a terminal of the high-current fuse section.

BRIEF DESCRIPTION OF THE DRAWINGS

FIGURE 1 illustrates, in perspective, a conventional capacitor bank incorporating an indicating fuse of prior-art construction;

FIG. 2 illustrates, in perspective, a typical capacitor utilized in the conventional bank of FIG. 1;

FIG. 3 illustrates more clearly, in side elevation, a prior-art type of fuse construction with the dotted lines indicating the blown condition of the fuse;

FIG. 4 illustrates, in vertical plan, the diagram of a fuse connection to the central bus;

FIG. 4a illustrates diagrammatically the electrical components involved between the bank terminals;

FIG. 5 illustrates, in side elevation, a capacitor-type current-limiting fuse embodying features of the present invention and shown in the intact condition;

FIG. 6 is a longitudinal sectional view taken through the fuse construction of FIG. 5;

FIG. 7 illustrates a typical notched high-current fuse element;

FIG. 8 illustrates, in side elevation, the fuse element of FIG. 7; and

FIG. 9 illustrates an alternate construction.

DESCRIPTION OF THE PREFERRED EMBODIMENT

Open structural type capacitor banks, commonly referred to as "stack type" equipments, are the most economical method of obtaining large blocks of kilovars at voltages from 2400 volts up to the highest transmission voltages. Capacitor units are mounted and interconnected at the factory into a structural frame or "stacking unit." Large banks are assembled at field locations by bolting insulators and stacking units on top of each other and interconnecting them. Selection of the capacitor unit voltage and kvar. and the stacking unit size are dependent upon the system voltage, bank kvar. and manner of connection. Capacitor units rated 25, 50 or 100 kvar., and from 2400 to 14,400 volts are arranged in series groups to match the system voltage. Sufficient units are connected in parallel in each series group to provide the required total bank kvar.

FIG. 1 illustrates a typical capacitor bank 1 comprising a plurality of capacitor units 2 having fuse connections 3 to the bus 4, with a fuse connection, such as illustrated in FIG. 3 of the drawings. The electrical connections are more readily apparent from an inspection of FIGS. 4 and 4a of the drawings. FIG. 2 illustrates a typical two-terminal capacitor unit 2, with terminal bushings 5, 6, and the dotted lines 8 in FIG. 3 illustrate the position of the fuse 3 indicating a blown condition, with the fuse pigtail 10 hanging downwardly, and the capacitor unit 2 completely isolated and disconnected from the central energized bus 4. The internal construction of the prior-art fuse 3 of FIG. 3, for example, may be that as set forth in U.S. Patent 3,259,719, issued July 5, 1966 to Robert T. Innis and George A. Rusnak and assigned to the assignee of the present application.

In accordance with the present invention, it is proposed to use a dual-sectional fuse construction 12 with a flexible fuse casing, or first insulating casing section 13. FIG. 5 illustrates, in side elevation, the intact condition of the fuse assembly 12 in acordance with the present invention, with FIG. 6 illustrating, in section, a longitudinal view of the interior of the dual-sectional fuse construction 12. Preferably, there is provided a high-current section 15 and a low-current section 16, which are maintained in abutting relationship, as at 17, as viewed in FIGS. 5 and 6, by a strain element 19, which, for example, may be provided by a Nichrome wire extending through the entire structure.

The high-current section 15 may preferably comprise an outer flexible casing section 13, which may, for example, be made of semi-rigid tubing, such as nylon, acetal polymers and copolymers, available for example as proprietary materials under the names Delrin and Celcon respectively. Also fluorocarbon polymers, e.g. polytetrafluorethylene and polytrifluorochloroethylene known under the trade names Teflon and Kel-F, respectively, polyvinyl chloride, laminated plastics with reinforcing materials such as paper, cotton, fibrous glass, nylon fabric or other synthetic fibers and resins such as phenolic, silicones or epoxies, fiber glass reinforced epoxy tubing, or other readily available flexible insulating tubing.

Soft non-rigid tubing, such as silicone rubber, or other flexible elastomeric material, heat-shrinkable vinyl tubing may also be used.

The insulating spacers 21 may be used to keep the high-current fusible element 23 centered in the tube 13, and can be made of ceramic, glass or other insulating disks, with the high-current fuse element 23 preferably being formed of silver. Sand 25 is interposed between the fuse element 23 and the inside wall of the outer flexible casing 13. A metallic terminal block 27 is preferably inserted within the left-hand interior end of the fuse casing 13, with a fuse ferrule 28, having a fuse terminal 29, surrounding the outer end of the fuse casing 13 and clamped thereto, as by a rolling operation 30. Similarly, the right-hand end of the high-current section 15 may comprise a block-type fuse terminal 31, which is inserted into the right-hand end of the fuse casing 13 having a ferrule ring 32 enveloping the outer surface of the fuse casing 13 and clamped thereto, as by a rolling operation 30.

The low-current section 16 may preferably comprise similar block-type fuse terminals 33, 34 having a low-temperature-meltable low-current fuse element 35, such as a tin-lead alloy solder, for example, disposed in sand, which will melt at a lower temperature than the high-current fuse element 23 will melt. The low-current fuse element 35 may be enclosed in a second insulating casing section.

It is contemplated that when fuse operation occurs, there will result a break-away action between the two fuse sections 15, 16, as at 17, to permit a visible indication of fuse operation, as indicated by the dotted lines 36 in FIG. 5. As well known by those skilled in the art, upon rupture of either the low-current fuse element 35 during low-value overcurrents, or during high fault current conditions, a rupture of both fuse elements 23, 35, the current is passed through the electrically-parallel strain element, or Nichrome wire 19, which will immediately vaporize, and, relieving the tension between the two abutting fuse sections 15, 16, will permit a break-away action to occur between the two block-type fuse terminals 31, 33, as at 17, thereby permitting their separation to result in the position indicated by the dotted lines 36 in FIG. 5.

FIGS. 7 and 8 illustrate a typical high-current fuse element 23, which may be constituted by a notched silver strap, which is electrically connected between the two fuse terminals 27, 31 by any suitable means well known to those skilled in the art. The strain element 19, which is preferably a Nichrome wire, may either extend the entire length L of the fuse 12, or as in the alternative embodiment 37 illustrated in FIG. 9, may extend only from the right-hand fuse terminal 34 to the right-hand terminal block 31 of the high-current fuse section 15. In such an eventuality, low-current operation will again cause the Nichrome wire 19′ to vaporize with the break-away action at 17 ensuing. High-current operation of such a modified fuse construction 37 will also cause a rupture of both fuse elements, and again the relatively short Nichrome strain element 19′ will be ruptured to effect a similar break-away action.

For certain applications, the fuse casing may be comprised of woven glass tubing with a rubber-covered surface to resist weathering and moisture. The important feature is to insure a somewhat flexible arrangement, such as illustrated in FIG. 5, to insure a separated condition of the two fuse sections 15, 16 upon fuse operation.

Although there has been illustrated and described specific structures, it is to be clearly understood that the same were merely for the purpose of illustration, and that changes and modifiactions may readily be made therein by those skilled in the art, without departing from the spirit and scope of the invention.

We claim as our invention:

1. An indicating fuse including a pair of spaced fuse terminals and a flexible fuse casing mechanically connecting said fuse terminals, first fusible means disposed interiorly of said flexible fuse casing and electrically connected to said spaced fuse terminals, another pair of fuse terminals with second fusible means extending therebetween, an insulating casing mechanically connecting said other spaced fuse terminals, one fuse terminal of each pair being held in abutment by a fusible strain element, whereupon fuse blowing will effect separation of said abutting fuse terminals, and the flexibility of said fuse casing will cause a dropped visual indicating position of said flexible fuse casing.

2. The fuse combination of claim 1, wherein the first fusible means has a current-limiting action, and the second fusible means is adapted to fuse on low-value overcurrents.

3. An indicating-type fusible device comprising a two-part insulating fuse-casing assembly having a first insulating casing section and a second insulating casing section, one of said insulating casing sections being flexible, fusible means extending through the fuse casing-assembly for maintaining the first and second insulating casing sections in end-to-end abutment in the unfused intact condition of the fusible device, whereby upon fusion of said fusible means the flexible casing section will break away from the other stationary casing section to move to a readily visual indicating blown position.

4. The fuse combination of claim 3, wherein the fusible means includes a strain wire extending at least through one of the insulating casing sections.

5. The fuse combination of claim 3, wherein one casing section encloses a high-current fusible element and the other casing section encloses a low-current fusible element, with both elements in electrical series relationship.

6. The combination of claim 5, wherein the high-current fusible element comprises a notched silver strap.

7. The combination of claim 3, wherein means causes flexure of said insulating flexible casing section in the operative intact condition of the fusible device.

8. The combination of claim 1, wherein means causes flexure of said flexible fuse casing in the operative intact condition of the indicating fuse.

References Cited

UNITED STATES PATENTS

| 2,356,352 | 8/1944 | Pittman | 337—190 X |
| 2,319,161 | 5/1943 | Schultz | 337—190 |

BERNARD A. GILHEANY, Primary Examiner

H. B. GILSON, Assistant Examiner

U.S. Cl. X.R.

337—190